United States Patent Office 3,078,983
Patented Feb. 26, 1963

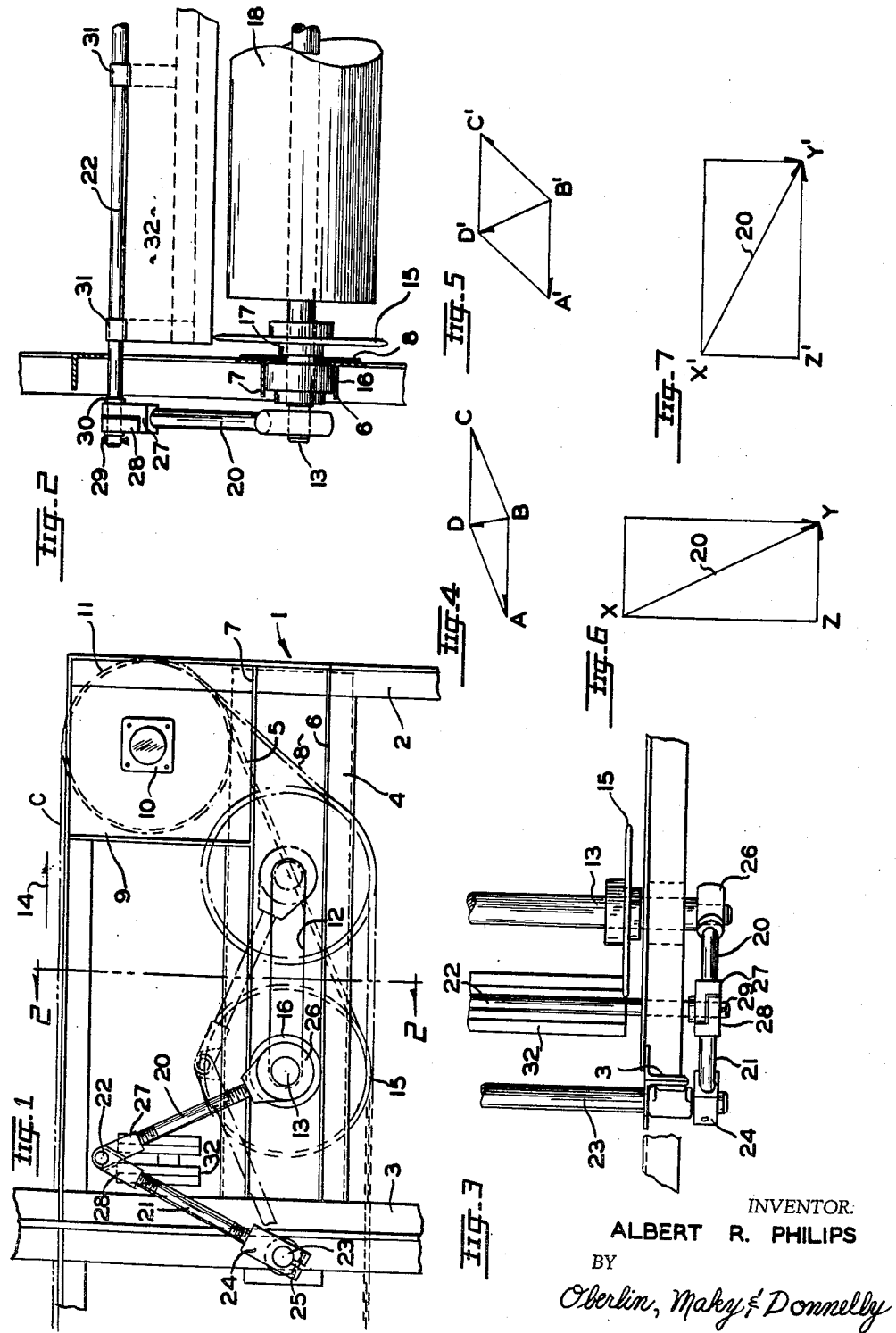

3,078,983
AUTOMATIC UNIFORM TENSION EXPANSION TAKE-UP FOR OVEN CONVEYOR
Albert R. Philips, Cleveland, Ohio, assignor to Young Brothers Company, Cleveland, Ohio, a corporation of Michigan
Filed June 12, 1959, Ser. No. 819,992
14 Claims. (Cl. 198—208)

This invention relates, as indicated, to an automatic uniform tension expansion take-up for oven conveyors and the like and more particularly to a tensioning mechanism for conveyors which are subject to excessive expansion and contraction as a result of wide variations in the temperatures to which they are subjected. Oven type conveyors may comprise at least two parallel continuous conveyor chains traveling upper and lower courses through an elongated oven and either support a belt adapted to carry objects therethrough, or themselves carry objects therethrough, as in a wicket type conveyor. The present tendency in the art is toward longer and longer ovens to permit greater speeds of conveyor travel which in turn increase the production moving through the furnace or oven. In this manner the work may be turned out faster and still subjected to adequate heat.

When the oven is heating, the metal links of the conveyor chain naturally tend to expand and lengthen as they become heated with resulting increase in the overall length of the conveyor which may amount to a fraction of an inch, in the case of shorter conveyors, to as much as several inches in the case of longer conveyors. Moreover, the chain links will tend to wear which results in a further increase in the length of the chain.

In the past, quite complex mechanisms have been employed to adjust the chain tension. These chain tensioning mechanisms generally comprise means to move a sprocket which is usually power driven as, for example, by an electric motor turning a fixed threaded nut to move threaded tie bars relative to the path of the chain, the tie bars being connected to the chain sprocket. The motor to drive this apparatus may be actuated by complex switches which are responsive to the sag or festooning of the chain, the motor being actuated in two directions to both tighten and loosen the chain. An example of this type of mechanism may be seen in the patent to Kratz, 2,306,448. A simple yet automatic oven conveyor tensioning mechanism has long been the desire of the industry.

It is therefore a principal object of my invention to provide a simple yet fully automatic oven conveyor tensioning mechanism that will maintain the conveyor in essentially the same tension throughout the temperature range employed in an industrial oven.

It is a further object of my invention to provide an automatic uniform tension expansion take-up for oven conveyors that may be easily constructed from readily available materials and which may be easily installed on the conveyor and will require a minimum of maintenance when in operation.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is a side elevation of my tensioning apparatus as employed on the end of an industrial oven conveyor;

FIG. 2 is a fragmentary vertical section taken generally on the line 2—2 of FIG. 1;

FIG. 3 is a fragmentary top plan view of the mechanism shown in FIG. 1;

FIGS. 4 and 5 are vector diagrams illustrating the forces of the conveyor chain on the lower sprocket in the retracted and extended positions, respectively; and FIGS. 6 and 7 are vector diagrams illustrating the force applied by my tensioning mechanism on the lower conveyor sprocket in the retracted and extended positions, respectively.

Referring now to the drawing and more particularly to FIG. 1, there is illustrated an end stand for the sprockets of my industrial oven conveyor, generally indicated at 1. The stand may be constructed from various structural members as by welding and is merely a means to mount the bearings for the main conveyor sprockets at one end of the oven. The stand includes legs 2 and 3 between which are mounted parallel angle members 4 and 5 having out-turned flanges 6 and 7. Welded or otherwise secured to the interior of these structural members is a plate 8 generally closing the space therebetween. Mounted on top of the structural member 7 in a plate 9 is the bearing 10 for the main end sprocket 11 of my industrial oven. It is here noted that the opposite side of the stand 1 is allochirally identical in form to the side shown in FIG. 1.

Within the plate 8 is an elongated horizontal opening 12 through which extends the shaft 13 of my idler or take-up sprocket. It will now be seen that the conveyor chain C travels in the direction of the arrow 14, shown in FIG. 1, around the sprocket or sheave 11 and then beneath the lower idler sprocket or sheave 15 mounted on the shaft 13.

Mounted on the shaft 13 exteriorly of the sprocket 15 is a rotatable bearing or roller 16 riding between the flanges 6 and 7 of the structural members 4 and 5. The wide flanges 6 and 7 present enlarged areas for the roller to bear on which materially reduces the wear problems involved. Since the opening 12 is slightly larger than the shaft 13, it can now be seen that the lower sprocket 15 is mounted on shaft 13 for horizontal movement to the extent of the elongated opening 12. A collar 17 may be employed between the opening 12 and the sprocket 15 properly to space the sprocket on the shaft 13. Suitable sheaves or pulleys 18 may be employed to drive flexible belts through the industrial oven in a conventional manner, the sprockets 15 merely driving the pulleys for rotation. It will, of course, be understood that a wicket type conveyor may be employed in which the wickets are fastened directly to the conveyor chain C.

It will now be seen that when the idler sprocket 15 is in the right hand end of the opening 12, as viewed in phantom lines in FIG. 1, the chain must move over a longer path and movement of the sprocket to this end will take up a considerable amount of slack in the chain. Conversely, movement of the sprocket to the left hand end of the opening 12, as seen in FIG. 1, would tend to loosen the chain.

My automatic uniform tension expansion take-up comprises means to move the shaft 13 along the elongated horizontal opening 12 with a force that will always keep the conveyor chain at the same tension, regardless of changes in the length thereof as the result of temperature variations within the oven. This mechanism generally comprises two arms of equal length 20 and 21, both of which are coaxially pivoted to a rod 22 extending across the conveyor path. The other end of arm 21 is clamped to shaft 23 and the other end of arm 20 is pivoted to the shaft 13. The shaft 23 is rotatably mounted on the upright leg structure 3 of the stand 1 at the same horizontal height as the center of elongated opening 12 in the illustrated embodiment. The arm 21 is threaded or otherwise secured in a split block 24 having a threaded adjusting member 25 controlling the clamping bearing pressure of the block upon the shaft 23. The arm 20 is secured to a bearing 26 whereby the arm 20 is free to pivot with respect to the shaft 13. The upper ends of the arms 20 and 21 are secured in mating pivot blocks 27 and 28 which are rotatably secured to the shaft 22 by means of cotter pin 29 and collar 30.

Pivoted to the shaft 22 by means of suitable spaced hangers 31 are weights 32 that can be pre-selected to exert the proper downward force upon the shaft 13. It will now be seen that their weights 32 exerting a downward force upon the shaft 22 will impart forces to the arms 20 and 21 which will tend to move the shaft 13 in a horizontal direction since the arm 21 is pivoted to a fixed shaft 23 and the shaft 13 is confined within the elongated horizontal slot 12. It will, of course, be understood that another pair of arms allochirally identical in form will be employed on the opposite ends of shafts 22, 23 and 13.

Referring now to FIGS. 4 and 5, I illustrate the vector diagrams of forces acting upon the shaft 13 in the retracted and extended positions, respectively. The point B will represent the shaft 13 in FIG. 4 and the forces BA and BC will represent the forces of the chain upon the shaft B, which result in the force BD being exerted against the shaft 13. As seen in FIG. 5, when the shaft is in its extended position, the angle of the chain extending from the sprocket 15 to the sprocket 11 will be increased with respect to the horizontal and since the forces B'A' and B'C' will remain the same as forces BA and BC, the resultant force B'D' substantially increases. In this manner, it can be seen that the force BD is considerably smaller than the force B'D' and since the movement of the shaft 13 is restricted to a horizontal direction because of the direction of the elongated opening 12, my belt tensioning device is designed to exert a force substantially to balance the force BD in the retracted position and substantially to balance the force B'D' in the extended position.

Referring to the vector diagrams of FIGS. 6 and 7, I illustrate the force components exerted by the weight 32 upon the arm 20. Since the movement of the shaft 13 is restricted to a horizontal direction, the horizontal component of the force of the weight 32 along the shaft or rod 20 is the only force that we need take into consideration. The weight 32 will exert a certain force XY along the arm 20 in its retracted position. The horizontal component of this force, which is ZY, will be the active force upon the shaft 13. However, as seen in FIG. 7, when the chain elongates as the result of an increase in the temperature within the oven, the arm 20 moves to the position there shown and has a horizontal component Z'Y' which is considerably greater than the horizontal component in its retracted position. It will readily be seen that as the vertical component of the force XY decreases, the horizontal component will increase. It will, of course, be understood that FIGS. 4 through 7 inclusive are not on the same scale but merely serve to illustrate the derivation of the forces involved.

As a result of my structure, the horizontal component of the forces exerted by the chains upon the shaft 13 will always be counterbalanced by a predetermined variable force exerted by the weights 32 through the arms 20. The position of the idler sprocket with respect to the main end sprocket as well as the weight 32 may be carefully selected so that for the particular conveyor application, the horizontal tensioning force on the shaft 13 will always keep the chains in the proper tension. It will also be understood that the positions of the shafts 13 and 23 relative to each other, as well as variations in the lengths of the arms 20 and 21, may be used to vary the resulting horizontal forces obtained. In this manner, the tension of the chain will always remain the same regardless of the variation in length as the result of temperature differentials within the oven.

Other modes of applying the principles of the invention may be employed, change being made as regards the details described, provided the features stated in any of the following claims, or the equivalent of such, be employed.

I, therefore, particularly point out and distinctly claim as my invention:

1. In an endless chain conveyor having generally parallel oppositely travelling courses, a fixed end sprocket, and a movable idler sprocket having an axis parallel to and closely spaced from said fixed sprocket, said chain being trained about said fixed sprocket and said movable sprocket; means operative to exert a variable force on said idler sprocket to shift the same in a direction to balance the forces imposed on said idler sprocket by said chain, said means increasing such variable force as the length of said chain conveyor increases.

2. A conveyor as set forth in claim 1 wherein said idler sprocket is mounted for limited horizontal movement.

3. A conveyor as set forth in claim 2 wherein said variable force on the said idler sprocket is exerted by weights in a resultant horizontal direction.

4. A conveyor as set forth in claim 3 wherein said idler sprocket is mounted on a rotatable shaft having rotatable bearings mounted thereon riding between parallel flanges.

5. A conveyor as set forth in claim 4 wherein said means comprises a rod extending across the path of the conveyor, weights suspended from said rod, two arms pivotally mounted on each end of said rod, one said arm on each end of said rod being pivoted to the shaft of said idler sprocket and the other being pivoted on an axis fixed with respect to said idler sprocket.

6. A conveyor as set forth in claim 5 wherein said axis is in the same horizontal plane as the shaft of said idler sprocket.

7. A conveyor as set forth in claim 6 wherein said arms are of equal length.

8. An endless chain conveyor for industrial ovens and the like comprising upper and lower courses, an end sprocket, a frame carrying said end sprocket, an idler sprocket vertically spaced from said end sprocket and mounted for horizontal movement in said frame, a shaft for said idler sprocket, a pair of arms on each side of said frame pivoted at one end to each other, one arm being pivoted at its other end to said shaft and the other arm being pivoted at its other end to said frame, a weight attached to said pairs of arms at their common pivot to exert a varying horizontal force on the idler sprocket.

9. An endless conveyor as set forth in claim 8 wherein said sprocket is mounted for horizontal movement in said frame by rolls rotatably mounted on said shaft and riding between parallel horizontally extending flanges on the frame.

10. An endless conveyor as set forth in claim 8 wherein said arms are of equal length.

11. Conveyor take-up means for an elongated flexible conveyor having upper and lower courses subject to expansion and contraction, comprising an end sheave about which said conveyor passes, a frame at one end carrying said sheave, an idler sheave vertically spaced from said end sheave, means mounting said idler sheave for movement within said frame to increase or decrease the length of path of said conveyor, and weight and leverage means to apply a variable force to said idler sheave to balance the forces of the conveyor on said idler sheave, said weight and leverage means increasing such variable force as the length of said chain conveyor increases.

12. A conveyor take-up as set forth in claim 11 wherein said sheave is mounted on a shaft having rollers thereon confined within vertically spaced horizontal flanges on said frame.

13. A conveyor as set forth in claim 12 wherein said weight and leverage means comprises upwardly extending arms coaxially pivotally mounted at their upper ends, the lower ends of said arms being pivoted to said idler shaft and said frame respectively, and a weight exerting a force longitudinally of said arms.

14. A conveyor as set forth in claim 13 wherein the lower ends of the arms are always symmetrical to the vertical plane of the upper pivot axis of said arms.

References Cited in the file of this patent

UNITED STATES PATENTS

| | | |
|---|---|---|
| 888,765 | Stevens | May 26, 1908 |
| 2,781,892 | Thevenieau | Feb. 19, 1957 |
| 2,883,037 | Lowe et al. | Apr. 21, 1959 |
| 2,907,450 | Reid | Oct. 6, 1959 |